(12) United States Patent
Hawes et al.

(10) Patent No.: US 8,278,257 B2
(45) Date of Patent: Oct. 2, 2012

(54) COLOR CHANGING PAINT REMOVING COMPOSITION

(75) Inventors: Charles L. Hawes, Cordova, TN (US); Dennis E. Shireman, Marion, AR (US)

(73) Assignee: W. M. Barr & Company, Inc., Memphis, TN (US)

( * ) Notice: Subject to any disclaimer, the term of this patent is extended or adjusted under 35 U.S.C. 154(b) by 206 days.

(21) Appl. No.: 11/100,310

(22) Filed: Apr. 6, 2005

(65) Prior Publication Data

US 2006/0229220 A1    Oct. 12, 2006

(51) Int. Cl.
*C09D 9/00* (2006.01)

(52) U.S. Cl. ........ 510/201; 510/202; 510/211; 510/213; 134/38; 106/190

(58) Field of Classification Search .................. 510/201, 510/174, 202, 213, 211; 106/190; 134/38
See application file for complete search history.

(56) References Cited

U.S. PATENT DOCUMENTS

| | | | |
|---|---|---|---|
| 2,507,983 A | 5/1950 | Kuentzel | |
| 4,120,810 A | 10/1978 | Palmer | |
| 4,579,627 A * | 4/1986 | Brailsford | 134/38 |
| 4,666,626 A | 5/1987 | Francisco | |
| 4,749,510 A | 6/1988 | Nelson | |
| 4,812,255 A | 3/1989 | Suwala | |
| 5,006,279 A | 4/1991 | Grobbel et al. | |
| 5,011,621 A | 4/1991 | Sullivan | |
| 5,049,300 A | 9/1991 | Fusiak et al. | |
| 5,188,666 A * | 2/1993 | Boccardo | 106/194.3 |
| 5,288,335 A | 2/1994 | Stevens | |
| 5,298,184 A * | 3/1994 | Jarema | 510/106 |
| 5,332,526 A | 7/1994 | Stanley | |
| 5,334,331 A * | 8/1994 | Fusiak | 510/174 |
| 5,468,415 A | 11/1995 | Jarema | |
| 5,478,491 A | 12/1995 | Jarema | |
| 5,609,678 A | 3/1997 | Bergman | |
| 5,753,603 A | 5/1998 | Lallier et al. | |
| 5,932,530 A * | 8/1999 | Radu et al. | 510/212 |
| 5,951,910 A * | 9/1999 | Skaggs et al. | 252/70 |
| 5,993,562 A * | 11/1999 | Roelofs et al. | 134/7 |
| 6,001,192 A | 12/1999 | Lallier et al. | |
| 6,057,276 A * | 5/2000 | Smith | 510/174 |
| 6,096,699 A * | 8/2000 | Bergemann et al. | 510/201 |
| 2004/0109853 A1 * | 6/2004 | McDaniel | 424/94.6 |

* cited by examiner

*Primary Examiner* — Mark Eashoo
*Assistant Examiner* — M. Reza Asdjodi
(74) *Attorney, Agent, or Firm* — Baker, Donelson, Bearman, Caldwell & Berkowitz, PC

(57) ABSTRACT

A composition and related process for removing paint from a substrate in which the composition contains a solvent, an organic filler and a colorant.

20 Claims, No Drawings

COLOR CHANGING PAINT REMOVING COMPOSITION

TECHNICAL FIELD

The present invention relates to a paint removing composition. In a more specific aspect, this invention relates to a color changing composition for removing paint from a substrate.

This invention also relates to a process for removing paint from a substrate by using a composition which changes color.

In this application, the term "paint" will be understood to refer to coatings such as epoxies, enamels, latexes, primers, basecoats, clearcoats, oil based paints, lacquers, varnishes, shellacs and polyurethane finishes which are used to protect and/or beautify substrates. As used in this application, the terms "paint removing", "paint remover" and "paint removal" refer to compositions which remove or facilitate the removal of paint from a substrate.

BACKGROUND OF THE INVENTION

Chemical based paint removers (also referred to as "paint strippers") have enjoyed widespread commercial application due to their relative ease of use when compared to various physical methods of paint removal, such as scraping and sanding. Many of these paint removers are solvent based, utilizing methylene chloride, methanol, acetone, toluene, xylene or other solvent components. While these solvents yield significant paint removal, they may also present potential health, safety and environmental concerns to both the user and the surrounding environment.

U.S. Pat. No. 2,507,983 discloses a paint stripper which contains methylene chloride and methyl cellulose, which is a thickening agent used to increase the viscosity of the formulation. Methylene chloride is an effective low cost paint stripper characterized by high vapor pressure (400 mm Hg at 75° F.) which causes the methylene chloride to evaporate very rapidly. This high vapor pressure may lead to a vapor inhalation hazard. In addition, methylene chloride is a suspected carcinogen as well as a dermal irritant. A further concern of methylene chloride is possible ground water contamination when the residual stripper is removed from the substrate.

In an effort to reduce the health, safety and toxicity concerns related to methylene chloride based paint strippers, several formulations utilizing N-methyl-2-pyrrolidone (NMP) have been developed. Because of its effectiveness, low toxicity, biodegradability and high flash point, NMP has been proposed as a substitute for chlorinated solvents. For example, U.S. Pat. Nos. 4,120,810; 4,666,626; 4,749,510; 4,812,255; 5,006,279; and 5,049,300 disclose paint stripping compositions which include NMP and other components, such as aromatic hydrocarbons or aromatic solvents.

These and other formulations, however, may still present potential health, safety and dermal hazards based on the absorption rate of the particular aromatic hydrocarbon or aromatic solvent used. In addition, many aromatic hydrocarbons are believed to be carcinogenic, pose environmental concerns and are troublesome regarding disposal of spent chemical.

U.S. Pat. No. 5,011,621 relates to mixtures of NMP, selected co-solvents (which may include aromatic hydrocarbons and terpenes such as d-limonene), as well as animal and/or vegetable oil, as a means to effectively remove paint from substrates. However, the presence of one or more of these natural components, such as tallows and fatty acids, may lead to the growth of microbiological organisms within the formulation, thereby decreasing the product's shelf life. The presence of microbiological organisms could lead to altered product performance as well as a noxious and rancid odor, especially when the product is exposed to sunlight.

Another concern with paint stripping compositions is how to determine when the composition has rendered at least a substantial portion of the paint removable from the substrate. This determination is important because the paint tends to solidify (i.e., harden) and re-adhere if applied to a substrate for an extended period of time. Of course, after the paint begins to solidify, removal of the paint is more difficult.

Paint stripping compositions which advertise a color change when the stripping action is substantially complete have been developed and are commercially available. However, we have found that these compositions do not function as advertised. We have found that the color change is due to the evaporation of free water from the composition and not due to the substantial completion of the stripping action. In addition, we have found that such compositions which contain a large amount of free water tend to harden on the surface, which makes removal of the composition and paint very difficult.

Thus, the industry is in need of an effective paint removal composition which eliminates or at least minimizes the concerns of shelf life, free water content, environmental and dermal problems, odor, toxicity, hardening of the composition and color change as discussed above.

SUMMARY OF THE INVENTION

The present invention provides a color changing composition for removing paint from a substrate. As compared to the compositions of the prior art as described above, the composition of this invention is more effective in removing paint from a substrate in an equivalent or shorter amount of time. In addition, the compositions of this invention tend to have low vapor pressures and high boiling points, which result in slower evaporation rates. The paint removing compositions of this invention also exhibit a color change when the paint removing function is substantially complete.

The present invention also provides a process for using this composition for removing paint from a substrate.

Briefly described, the present invention removes paint from a substrate by using a new and advantageous composition which contains N-methyl-2-pyrrolidone or a dibasic ester, an organic filler and a colorant. Each component in the composition is used in a defined weight percent range, based on the total weight of the composition.

Accordingly, an object of this invention is to provide a composition for removing paint from a substrate.

Another object of this invention is to provide a composition for removing paint from a substrate wherein the composition is effective in removing paint in an equivalent or shorter amount of time, as compared to prior color change paint removing compositions.

Another object of this invention is to provide a composition wherein the composition has a slow evaporation rate.

Another object of this invention is to provide a paint removing composition which changes color to indicate that paint is removable from a substrate.

Another object of this invention is to provide a paint removing composition which contains no, or a minimal amount of, free water.

Another object of this invention is to provide a paint removing composition which contains an organic filler.

Still another object of this invention is to provide a process for removing paint from a substrate.

Still another object of this invention is to provide a process for removing paint from a substrate by using a composition which is effective in removing paint in an equivalent or shorter amount of time, as compared to prior color change paint removing compositions.

Still another object of this invention is to provide a process for removing paint from a substrate by using a composition which has a slow evaporation rate.

Still another object of this invention is to provide a process for removing paint from a substrate by using a composition which changes color to indicate that paint is removable from the substrate.

Still another object of this invention is to provide a process for removing paint from a substrate by using a composition which contains no, or a minimal amount of, free water.

Another object of this invention is to provide a process for removing paint from a substrate by using a composition which contains an organic filler.

These and other object, features and advantages of the present invention will become apparent from the following description.

DETAILED DESCRIPTION OF THE INVENTION

The present invention provides a composition for removing paint from a substrate, wherein the composition comprises N-methyl-2-pyrrolidone or a dibasic ester, an organic filler and a colorant. The present invention also provides a process by which the above defined composition is used to remove paint from a substrate.

As used in this application, the term "substrate" will be understood to include wood, metal, masonry and other types of surfaces to which paint can be applied.

As defined above, there are certain essential components in the composition of this invention. These components and their corresponding weight percent ranges are shown below, with the weight percents being based on the total weight of the composition.

| Component | Weight Percent Range |
| --- | --- |
| N-methyl-2-pyrrolidone (NMP) or a Dibasic Ester | about 10.0 to about 80.0 (preferably about 20.0 to about 60.0) |
| Organic Filler | about 20.0 to about 60.0 (preferably about 30.0 to about 50.0) |
| Colorant | about 0.01 to about 1.0 (preferably about 0.05 to about 0.5) |

If these components are used in amounts outside these ranges, the paint removal composition may provide less desirable results.

As discussed above, NMP is used as a substitute or replacement for chlorinated solvents, such as methylene chloride, in paint removing compositions. Other solvents can be used instead of, or in mixture with, the NMP. Examples of such other solvents are dibasic esters, such as dimethyl adipate, dimethyl glutarate and dimethyl succinate; carbonates, such as ethylene carbonate, propylene carbonates and butylene carbonate; alcohols, such as ethyl alcohol, benzyl alcohol, furfuryl alcohol and tetrahydrofurfuryl alcohol; d-limonene; dimethyl sulfoxide; methyl esters; methylal; and mixtures thereof.

In this invention, the use of an organic filler and a colorant provides a paint removing composition with the ability to change color to indicate that a substantial amount of paint is removable from the substrate.

Examples of organic fillers which can be used in this invention include the starches, cellulosic materials, flour, carbohydrates and mixtures thereof. Suitable starches include potato, rice and corn starch and mixtures thereof. Suitable cellulosic materials include hydroxypropyl methyl cellulose and hydroxypropyl cellulose. Suitable carbohydrates include monosaccharides, disaccharides and polysaccharides, such as glucose and lactose. Mixtures of two or more organic fillers can be used.

In the compositions of this invention, the organic filler functions as a base for the color change of the composition, but also functions as a filler and provides opacity so that the area of application can be easily seen, helps reduce odor and helps to solidify the stripped paint so clean up and waste disposal are easier.

The colorant useful in this invention can be selected from commercially available pigments and dyes which enable the composition to change color when at least a substantial portion of the paint is in a condition to be removed from the substrate.

Optional components may be added to the composition of this invention to achieve other objectives. Examples of these optional components are other colorants, stabilizers, evaporation retardants, bittering agents, other solvents, free water, viscosity enhancers, pH adjusting agents, etc. These optional components can be used in the amounts necessary to achieve the desired objectives.

A preferred optional component is a thickening agent, which can be an inorganic or organic material. Examples of suitable inorganic thickening agents are silica, metallic silicates and clays. Examples of suitable organic thickening agents are polymeric materials (such as cellulosic materials) and gums. Mixtures of thickening agents can also be used. Preferred thickening agents are methyl cellulose and hydroxypropyl cellulose.

If used in the paint removing compositions of this invention, the thickening agent is present in an amount from about 0.1 to about 5.0 percent by weight, based on the total weight of the composition.

If used in the compositions of this invention, the amount of free water is minimal to avoid interference with the color change. The term "minimal amount" refers to less than about 2.0 percent by weight of free water, preferably less than about 1.5 percent by weight, based on the total weight of the composition. Water of hydration or water which is contained within the structure of various components of this composition is not included in the term "free water".

The present invention is further illustrated by the following example which is designed to teach those of ordinary skill in the art how to practice this invention and to represent the best mode contemplated for carrying out this invention.

EXAMPLE

A commercially available paint removing composition contained the following components, with the approximate weight percent (from our analysis) being based on the total weight of the composition.

| Component | Approximate Weight Percent |
| --- | --- |
| N-methyl-2-pyrrolidone | 10 |
| Dibasic Ester | 18 |
| Carbohydrate (starch) | 45 |
| Free Water | 25 |
| Metallic Silicate Thickener | 2 |
| Green Dye | trace |

In regard to this commercially available paint removing composition, the manufacturer advertises that the composition changes color when the paint was ready to strip. However, testing of this product showed very slow performance on latex paint and very little performance on oil based paint. However, the color appeared to change with the evaporation of the large amount of water in the composition. Thus, the color change was not always indicative of the composition having stripped the paint, especially with the oil based paints which are more difficult to strip.

The following paint removing composition of this invention is prepared using conventional techniques and process steps.

| Component | Weight Percent |
|---|---|
| N-methyl-2-pyrrolidone | 10.00 |
| Dibasic Ester | 37.95 |
| Common Starch | 45.00 |
| Surfactant | 1.00 |
| Mineral Oil | 0.90 |
| Hydroxypropyl Cellulose | 0.60 |
| Pigment | 0.05 |
| Diglycol Amine | 0.50 |
| Methyl Soyate | 4.00 |
| | 100.000 |

This composition was tested for paint removal properties with oil based and latex paints.

By comparison to the commercially available composition described above in this example, the performance of the composition of this invention was much faster on latex paint and did work better on oil based paint. Our composition that contained no free water works better with regards to performance and also with respect to the change of color indicating that paint is removable from the substrate.

This invention has been described in detail with particular reference to certain embodiments, but variations and modifications can be made without departing from the spirit and scope of the invention as defined in the following claims.

What is claimed is:

1. A color changing composition for removing paint from a substrate, wherein the composition consists essentially of the following components:
  A. from about 10.0 to about 80.0 percent by weight of N-methyl-2-pyrrolidone, a dibasic ester or a mixture thereof;
  B. from about 0.01 to about 1.0 percent by weight of a pigment, dye or mixture thereof; and
  C. from about 30.0 to about 60.0 percent by weight of starch;
    wherein the composition contains from zero to less than about 2.0 percent by weight free water and wherein the composition exhibits a color change to indicate that paint is removable from the substrate.

2. A composition as defined by claim 1 wherein the composition contains from about 20.0 to about 60.0 percent by weight of N-methyl-2-pyrrolidone.

3. A composition as defined by claim 1 wherein the composition contains from about 20.0 to about 60.0 of a dibasic ester.

4. A composition as defined by claim 3 wherein the dibasic ester is dimethyl adipate, dimethyl glutarate, dimethyl succinate or mixture thereof.

5. A composition as defined by claim 1 wherein the composition contains a solvent selected from ethylene carbonate, propylene carbonate, ethyl alcohol, benzyl alcohol, furfuryl alcohol, tetrahydrofurfuryl alcohol, d-limonene, dimethyl sulfoxide, methyal or mixture thereof.

6. A composition as defined by claim 1 wherein the composition contains from about 30.0 to about 50.0 percent by weight of starch.

7. A composition as defined by claim 6 wherein the starch is potato starch, rice starch, corn starch or mixture thereof.

8. A composition as defined by claim 1 wherein the composition contains from about 0.1 to about 1.0 percent by weight of an inorganic or organic thickening agent.

9. A composition as defined by claim 8 wherein the thickening agent is a silica, metallic silicate, clay, gum, polymer or mixture thereof.

10. A composition as defined by claim 8 wherein the thickening agent is hydroxypropyl methyl cellulose, hydroxypropyl cellulose or mixture thereof.

11. A process for removing paint from a substrate, wherein the process comprises treating the substrate with a composition which consists essentially of the following components:
  A. from about 10.0 to about 80.0 percent by weight of N-methyl-2-pyrrolidone, a dibasic ester or a mixture thereof;
  B. from about 0.01 to about 1.0 percent by weight of a pigment, dye or mixture thereof; and
  C. from about 30.0 to about 60.0 percent by weight of starch;
    wherein the composition contains from zero to less than about 2.0 percent by weight free water and wherein the composition exhibits a color change to indicate that paint is removable from the substrate.

12. A process as defined by claim 11 wherein the composition contains from about 20.0 to about 60.0 percent by weight of N-methyl-2-pyrrolidone.

13. A process as defined by claim 11 wherein the composition contains from about 20.0 to about 60.0 of a dibasic ester.

14. A process as defined by claim 13 wherein the dibasic ester is dimethyl adipate, dimethyl glutarate, dimethyl succinate or mixture thereof.

15. A process as defined by claim 11 wherein the composition contains a solvent selected from ethylene carbonate, propylene carbonate, ethyl alcohol, benzyl alcohol, furfuryl alcohol, tetrahydrofurfuryl alcohol, d-limonene, dimethyl sulfoxide, methyal or mixture thereof.

16. A process as defined by claim 11 wherein the composition contains from about 30.0 to about 50.0 percent by weight of starch.

17. A process as defined by claim 16 wherein the starch is potato starch, rice starch, corn starch or mixture thereof.

18. A process as defined by claim 11 wherein the composition contains from about 0.1 to about 1.0 percent by weight of an inorganic or organic thickening agent.

19. A process as defined by claim 18 wherein the thickening agent is a silica, metallic silicate, clay, gum, polymer or mixture thereof.

20. A process as defined by claim 18 wherein the thickening agent is hydroxypropyl methyl cellulose, hydroxypropyl cellulose or mixture thereof.

* * * * *